(12) United States Patent
Lai (10) Patent No.: US 8,049,726 B2
(45) Date of Patent: Nov. 1, 2011

(54) OPTICAL TRACE DETECTING MODULE

(75) Inventor: Chien-Mo Lai, Taipei County (TW)

(73) Assignee: Kye Systems Corp., San Chung, Taipei (TW)

( * ) Notice: Subject to any disclaimer, the term of this patent is extended or adjusted under 35 U.S.C. 154(b) by 547 days.

(21) Appl. No.: 12/318,369

(22) Filed: Dec. 29, 2008

(65) Prior Publication Data

US 2010/0123655 A1 May 20, 2010

(30) Foreign Application Priority Data

Nov. 14, 2008 (TW) ................................ 97144212 A (51) Int. Cl.
*G06F 3/033* (2006.01)
*G09G 5/08* (2006.01)
(52) U.S. Cl. ........................................ 345/166; 345/163
(58) Field of Classification Search .................. 345/156, 345/163–169, 173, 179
See application file for complete search history.

(56) References Cited

U.S. PATENT DOCUMENTS

| | | | |
|---|---|---|---|
| 2008/0062096 A1* | 3/2008 | Yamashita et al. | 345/82 |
| 2008/0100936 A1* | 5/2008 | Theytaz et al. | 359/838 |
| 2008/0198102 A1* | 8/2008 | Yamashita et al. | 345/76 |
| 2008/0231600 A1* | 9/2008 | Smith | 345/166 |
| 2009/0283341 A1* | 11/2009 | Lin | 178/18.09 |
| 2009/0289177 A1* | 11/2009 | Yao et al. | 250/221 |
| 2009/0295728 A1* | 12/2009 | Su | 345/166 |

FOREIGN PATENT DOCUMENTS

TW M304078 7/1995

* cited by examiner

*Primary Examiner* — Ricardo L Osorio
(74) *Attorney, Agent, or Firm* — Bacon & Thomas, PLLC (57) ABSTRACT

An optical trace detecting module is disposed in a computer input device. The computer input device is able to displace on a plane relatively, and has a light-pervious plate used for an object to contact with and move on a surface thereof. The optical trace detecting module includes a circuit board, a first projection set, a second projection set, and at least one optical path diverting element. An optical sensor is electrically disposed on the circuit board. The first projection set is opposite to the light-pervious plate. The second projection set is opposite to the plane. The optical path diverting element is disposed between the two projection sets and the optical sensor, so as to direct the sensing beams emitted by the two projection sets to reach the optical sensor, thereby generating corresponding control signals.

12 Claims, 4 Drawing Sheets

OPTICAL TRACE DETECTING MODULE

CROSS-REFERENCE TO RELATED APPLICATIONS

This non-provisional application claims priority under 35 U.S.C. §119(a) on Patent Application No(s). 097144212 filed in Taiwan, R.O.C. on Nov. 14, 2008 the entire contents of which are hereby incorporated by reference.

BACKGROUND OF THE INVENTION

1. Field of Invention

The present invention relates to a trace detecting sensor, and more particularly to an optical trace detecting module with an optical path diverting element.

2. Related Art

With the development and advancement of technology, computer equipment, no matter it is a Personal Computer (PC) or a Notebook computer, has become a convenient and indispensable tool for people's daily life or work. However, only with a cursor input device such as a mouse, touch pad, tracking ball can the computer equipment perform the control of the window interfaces of the computer equipment.

Take an optical mouse as an example. An optical mouse emits lights from an optical sensing module mounted at the bottom of it, the lights are reflected from a surface of an object to an optical sensor of the optical sensing module, and the optical sensor detects the variation of the lights reflected from the surface of the object, thereby generating a corresponding cursor moving signal. For example, if a user intends to control the scrolling of window pages, he/she still has to rotate the wheel disposed at the top of the mouse to cause an encoder connected to the wheel to output a control signal, so as to control the scrolling of the window pages up and down correspondingly.

In recent years, Touch Control modules that have cursor control functions and can perform preset functions have been developed, and those functions have entirely replaced the functions of the optical sensing modules and buttons of the conventional mouse. A Touch Control module is disposed at an upper casing of a mouse. A user can control the position of the cursor selectively by the optical sensing module at the bottom of the mouse, or by a finger sliding on the Touch Control module, thereby generating a corresponding control signal.

Various optical elements in a conventional Touch Control module are stacked to form a completed optical path. Accordingly, the irradiating distance between the light emitting diode and the optical sensor must be lengthened relatively, such that the lights emitted by the light emitting diode can be refracted into the optical sensor accurately. Multiple optical sensors and optical systems have to be used to generate the scrolling control signal from a finger sliding on the Touch Control module and the cursor control signal from the bottom of the mouse displacing on a plane, respectively, which causes the space occupied by the Touch Control module increased accordingly, such that the volume of an electronic device equipped with a Touch Control module is greatly increased and the device cannot be thin. As a result, recently, other than applying to a computer cursor input device such as a mouse, the Touch Control module is difficult to be carried in a portable electronic device such as a cell phone, personal digital assistant (PDA), and flat panel computer.

In addition, a conventional Touch Control module has multiple optical sensors and optical systems. Therefore, the design of the wirings between various parts and the Touch Control module in a mouse must be considered, thus resulting in the increased number of the process sequences. Moreover, optical sensors are expensive such that the prices of electronic devices equipped with a Touch Control module are high, which cannot satisfy the recent demands of consumers that the electronic devices must be light, thin and cheap.

Taiwan Patent No. M304078 discloses a cursor control mechanism. A light source in the mechanism emits a light beam that is incident at one side of a spectroscope, and the light incident to the spectroscope is split into two light beams. One beam follows its original path to project to the surface of a sphere, and the other beam is refracted downwards to the operating desktop of the mouse, so as to retrieve an image through an image sensor.

Although the Patent No. M304078 addressed the problem that multiple sensors must be disposed in the mouse, after the two light beams from the spectroscope are incident to the sphere and the operating desktop respectively, scattering occurs. Furthermore, the scattered light beams are reflected to the light source, thus resulting in undesirable optical sensing efficiency of the mouse.

SUMMARY OF THE INVENTION

In view of the above problems, the present invention is directed an optical trace detecting module to address the problem that multiple optical sensors must be used in conventional Touch Control modules, such that the volume of the Touch Control module can not be thin, the assembly is too complex, the manufacturing cost is too high, and the like.

An optical trace detecting module provided according to an embodiment of the present invention is disposed in a computer input device. A light-pervious plate is disposed on an upper surface of the computer input device, and the light-pervious plate is used for an object to contact with and move on a surface thereof. A lower surface of the computer input device may displace on a plane relatively. The optical trace detecting module includes a circuit board, a first projection set, a first optical path diverting element, a second projection set, a second optical path diverting element, and an imaging lens. An optical sensor is electrically disposed on the circuit board. The first projection set is opposite to the light-pervious plate. The first optical path diverting element is located between the first projection set and the optical sensor. The second projection set is opposite to the plane. The second optical path diverting element is located between the second projection set and the optical sensor. The imaging lens is disposed between the two optical path diverting elements and the optical sensor. The two projection sets enable the object and the plane to reflect a first reflecting beam and a second reflecting beam respectively. Then, the reflecting beams are directed by the two optical path diverting elements to pass through the imaging lens, and are refracted to the optical sensor, such that the optical sensor generates control signals corresponding to different reflecting beams.

An optical trace detecting module provided according to a second embodiment of the present invention is disposed in a computer input device. A light-pervious plate is disposed on an upper surface of the computer input device, and the light-pervious plate is used for an object to contact with and move on a surface thereof. A lower surface of the computer input device may displace on a plane relatively. The optical trace detecting module includes a circuit board, a first projection set, a second projection set, an optical path diverting element, and an imaging lens. A bispectral optical sensor is electrically disposed on the circuit board. The first projection set is opposite to the light-pervious plate. The second projection set is opposite to the plane. The optical path diverting element is located between the first projection set and the second projection set. The imaging lens is disposed between the optical path diverting element and the bispectral optical sensor. The two projection sets enable the object and the plane to reflect a first reflecting beam and a second reflecting beam respectively. The reflecting beams of different wavelengths are directed by the optical path diverting element to pass through the imaging lens respectively, and are refracted to the bispectral optical sensor, such that the bispectral optical sensor generates control signals corresponding to different reflecting beams.

An optical trace detecting module provided according to a third embodiment of the present invention is disposed in a computer input device. A light-pervious plate is disposed on an upper surface of the computer input device, and the light-pervious plate is used for an object to contact with and move on a surface thereof. A lower surface of the computer input device may displace on a plane relatively. The optical trace detecting module includes a circuit board, a first projection set, a first optical path diverting element, a second projection set, a second optical path diverting element, and an imaging lens. A bispectral optical sensor is electrically disposed on the circuit board. The first projection set is opposite to the light-pervious plate. The first optical path diverting element is located between the first projection set and the bispectral optical sensor. The second projection set is opposite to the plane. The second optical path diverting element is located between the first optical path diverting element and the bispectral optical sensor. The imaging lens is disposed between the second optical path diverting element and the bispectral optical sensor. The two projection sets enable the object and the plane to reflect a first reflecting beam and a second reflecting beam respectively. The reflecting beams of different wavelengths are directed by the two optical path diverting elements to pass through the imaging lens respectively, and are refracted to the bispectral optical sensor, such that the bispectral optical sensor generates control signals corresponding to different reflecting beams.

The present invention has the following efficacies. With a single optical sensor cooperated with the incorporated light path modules, the optical trace detecting module has the capability of displacement calculation based on the sensing beams of different wavelengths and various sampling times of signals without using too many optical sensors. Moreover, the volume of the optical trace detecting module is significantly reduced as a result of the modular design of the light path module, and the objective of making the module thinner is thus achieved.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The optical trace detecting module disclosed according to the present invention is applicable in a computer input device. The computer input device includes, but not limited to, computer peripheral input devices such as a mouse, tracking ball, and game console, and can be built into computer peripheral products such as a notebook computer, sounder host, and digital photo frame. In the following detailed description of the present invention, a mouse is exemplified as the best embodiment of the present invention. However, the company drawings are used for the purpose of reference and illustration only, and not to limit the present invention.

Figure 1:
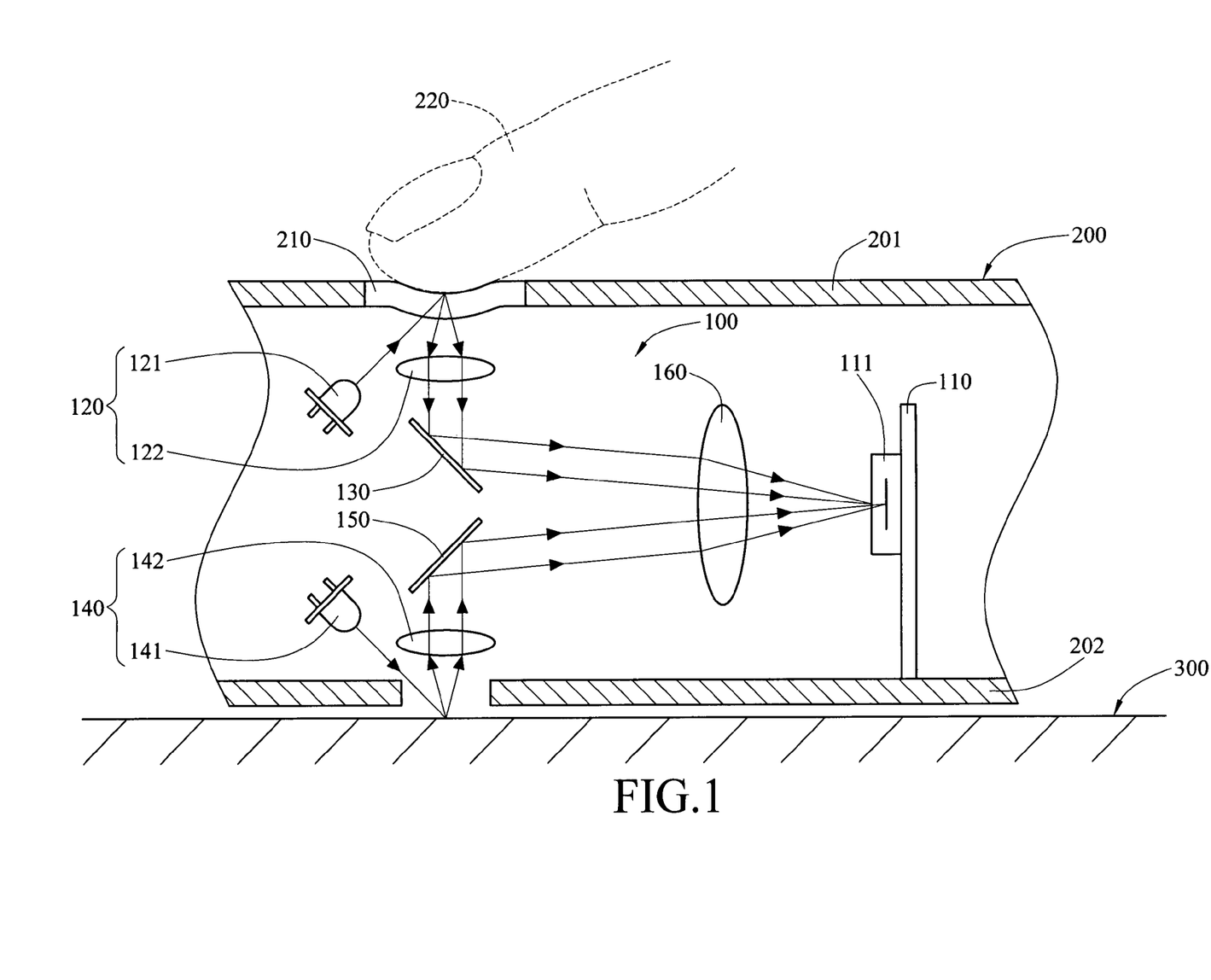
FIG. 1 is a schematic view of a first embodiment of the present invention.

FIG. 1 shows an optical trace detecting module 100 according to a first embodiment of the present invention. Referring FIG. 1, the optical trace detecting module 100 is disposed in a computer input device 200. An opening is provided in the upper surface 201 of the computer input device 200, and the opening is used for accommodating a light-pervious plate 210 and for an object 220 (e.g., a finger of a user) to contact with and slide on the surface of the light-pervious plate. A lower surface 202 of the computer input device 200 contacts with a plane 300 and may displace on the plane 300 relatively. The light-pervious plate 210 can be a transparent plate or lens made of transparent plastic, acryl, or glass that does not reduce the sensing efficiency of the optical trace detecting module 100. Furthermore, the light-pervious plate 210 has the function of light filtering to avoid the interference from the ambient lights. In addition, the light-pervious plate 210 may be, but not limited to, in the form of planar transparent plate, plano-concave lens, biconcave lens, plano-convex lens, or biconvex lens.

The optical trace detecting module 100 according to the first embodiment of the present invention includes a circuit board 110, a first projection set 120, a first optical path diverting element 130, a second projection set 140, a second optical path diverting element 150, and a third imaging lens 160. An optical sensor 111 is electrically disposed on the circuit board 110 to receive images reflected from the object 220 and the plane 300. The first projection set 120 includes a first light source 121 and a first imaging lens 122. The first light source 121 and the first imaging lens 122 are disposed opposite to the light-pervious plate 210, and the first light source 121 may emit a first sensing beam. The first optical path diverting element 130 is disposed between the first projection set 120 and the optical sensor 111. The second projection set 140 includes a second light source 141 and a second imaging lens 142. The second light source 141 and the second imaging lens 142 are disposed opposite to the plane 300, and the second light source 141 may emit a second sensing beam passing through the opening of the lower surface 202. The second optical path diverting element 150 is disposed between the second projection set 140 and the optical sensor 111. The third imaging lens 160 is disposed between the first and second optical path diverting element 130, 150 and the optical sensor 111.

As shown in FIG. 1, when the first light source 121 emits the first sensing beam toward the light-pervious plate 210, the object 210 (e.g., a finger) moving on the light-pervious plate 210 reflects a first reflecting beam to the first imaging lens 122. The first reflecting beam is directed by the first optical path diverting element 130 to pass through the third imaging lens 160 and is refracted to the optical sensor 111, such that the optical sensor 111 senses the displacement of the object 220 moving on the light-perviousplate 210, and generates a corresponding first control signal. When the second light source 141 emits the second sensing beam toward the plane 300, the plane 300 reflects a second reflecting beam to the second imaging lens 142. The second reflecting beam is directed by the second optical path diverting element 150 to pass through the third imaging lens 160 and is refracted to the optical sensor 111, such that the sensor 111 senses the second reflecting beam from the plane 300, and generates a corresponding second control signal. The method of the displacement detecting and calculating may be an image detecting method or an optical detecting method at least, but that part is not the subject matter of the present invention, so the description thereof has been omitted.

It should be noted that, the first optical path diverting element 130 and the second optical path diverting element 150 disclosed according to the present invention are reflectors. However, different types of light directing methods may be employed by those skilled in the art, and not limited by the embodiments disclosed according to the present invention. In addition, the optical sensor 111 disclosed in the present invention may be a Charged Coupled Device (CCD) or a Complementary Metal-Oxide semiconductor (CMOS). The first light source 121 and the second light source 141 may be a light emitting element such as a light emitting diode (LED) or a laser diode, which is used for emitting light beams with pointing feature.

Figure 2:
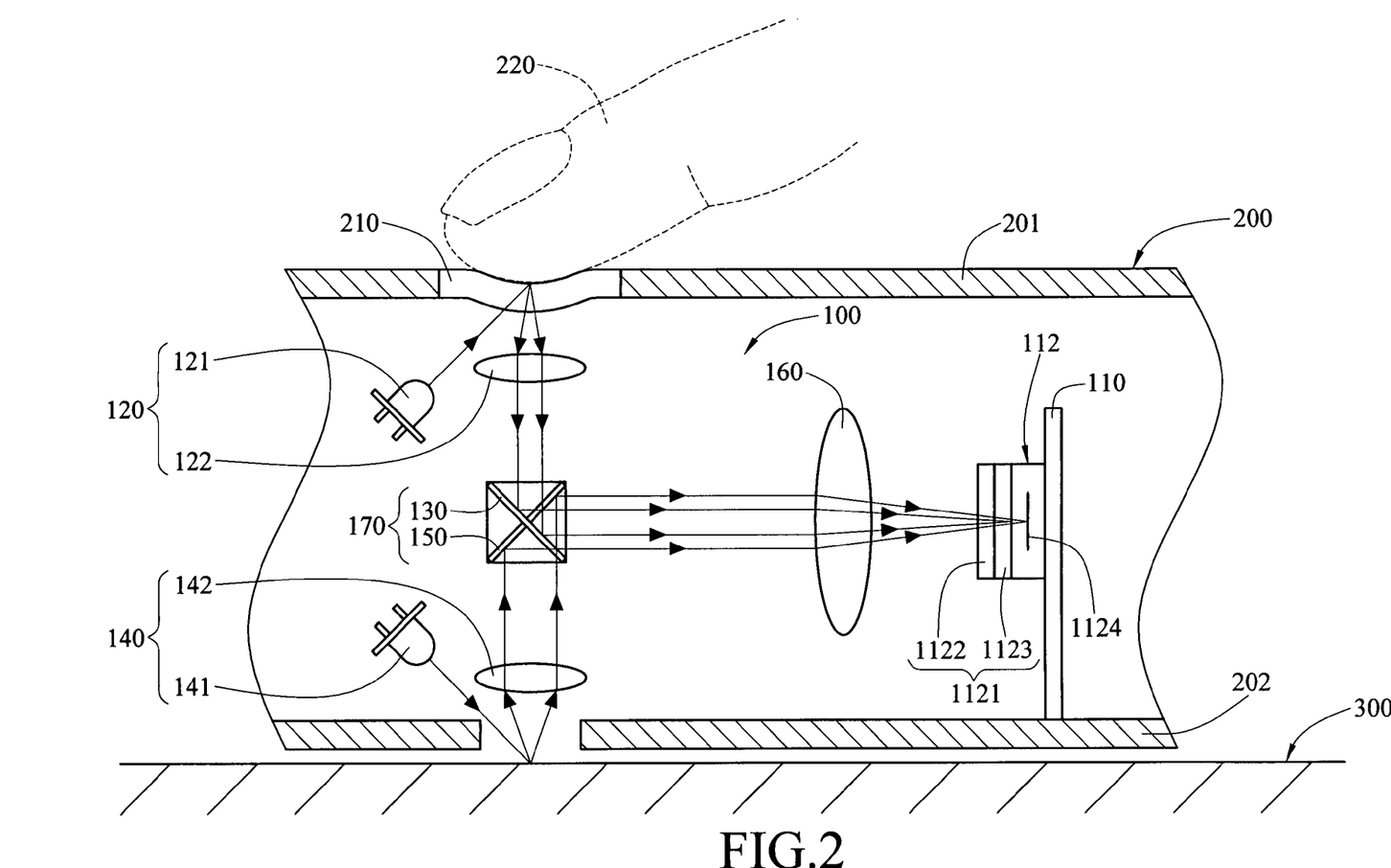
FIG. 2 is a schematic view of a second embodiment of the present invention.

FIG. 2 shows an optical trace detecting module 100 according to a second embodiment of the present invention. Referring FIG. 2, the optical trace detecting module 100 is disposed in a computer input device 200. A light-pervious plate 210 is provided on the upper surface 201 of the computer input device 200, and the light-pervious plate 210 is used for an object 220 (e.g., a finger of a user) to contact with and slide on the surface of it. A lower surface 202 of the computer input device 200 contacts with a plane 300 and may displace on the plane 300 relatively. The light-pervious plate 210 can be transparent plate or lens made of transparent plastic, acryl, or glass that does not reduce the sensing efficiency of the optical trace detecting module 100. Furthermore, the light-pervious plate 210 has the function of light filtering to avoid the interference from the ambient lights. In addition, the light-pervious plate 210 may be, but not limited to, in the form of planar transparent plate, plano-concave lens, biconcave lens, plano-convex lens, or biconvex lens.

The optical trace detecting module 100 according to the second embodiment of the present invention includes a circuit board 110, a first projection set 120, a second projection set 140, a double sided reflecting prism 170, and a third imaging lens 160. A bispectral optical sensor 112 is electrically disposed on the circuit board 110 to receive the images reflected from an object 220 and a plane 300. The first projection set 120 includes a first light source 121 and a first imaging lens 122. The first light source 121 and the first imaging lens 122 are disposed opposite to the light-pervious plate 210, and the first light source 121 may emit a first sensing beam having a first wavelength. The second projection set 140 includes a second light source 141 and a second imaging lens 142. The second light source 141 and the second imaging lens 142 are disposed opposite to the plane 300, and the second light source 141 may emit a second sensing beam having a second wavelength different from the first wavelength. The double sided reflecting prism 170 is disposed between the first projection set 120 and the second projection set 140. The third imaging lens 160 is disposed between the double sided reflecting prism 170 and the bispectral optical sensor 112. It should be noted that, in this embodiment, the first optical path diverting element 130 and the second optical path diverting element 150 of FIG. 1 may together form a double sided reflecting prism (X prism) 170. With a surface coated with a film of the double sided reflecting prism 170, the first reflecting beam or the second reflecting beam can be transmitted or reflected.

As shown in FIG. 2, when the first light source 121 emits the first sensing beam toward the light-pervious plate 210, the object 220 reflects a first reflecting beam to the first imaging lens 122. The first reflecting beam is directed by the double sided reflecting prism 170 to pass through the third imaging lens 160 and is refracted to the bispectral optical sensor 112, such that the bispectral optical sensor 112 senses the displacement of the object 220 moving on the light-pervious plate 210, and generates a corresponding first control signal. When the second light source 141 emits the second sensing beam toward the plane 300, the plane 300 reflects a second reflecting beam to the second imaging lens 142. The second reflecting beam is directed by the double sided reflecting prism 170 to pass through the third imaging lens 160 and is refracted to the bispectral optical sensor 112, such that the bispectral optical sensor 112 senses the second reflecting beam from the plane 300, and generates a corresponding second control signal.

The bispectral optical sensor 112 disclosed according to the second embodiment of the present invention further includes a filtering unit 1121 and a light signal receiving area 1124. The filtering unit 1121 further includes a first filter 1122 and a second filter 1123. The first filter 1122 is used for filtering out the first reflecting beam having the first wavelength, and the second filter 1123 is used for filtering out the second reflecting beam having the second wavelength. The light signal receiving area 1124 is disposed on one side of the filtering unit 1121 to receive the first reflecting beam and the second reflecting beam.

It should be noted that, the light signal receiving area 1124 disclosed according to the present invention may be an image detection sensor, such as a CCD or a CMOS, which is used for detecting the variation of the image resulted from the finger's moving. The light signal receiving area 1124 may also be a radiation detection sensor for detecting the variation of the physical properties of the light after being refracted, thereby obtaining a corresponding image data.

In the second embodiment of the present invention, the first reflecting beam and the second reflecting beam having different wavelengths are utilized to enable the bispectral optical sensor 112 to determine whether the light is reflected from the object 220 or the plane 300, so as to accordingly retrieve and calculate the amount of displacement of the object 220 or the plane 300.

Figure 3:
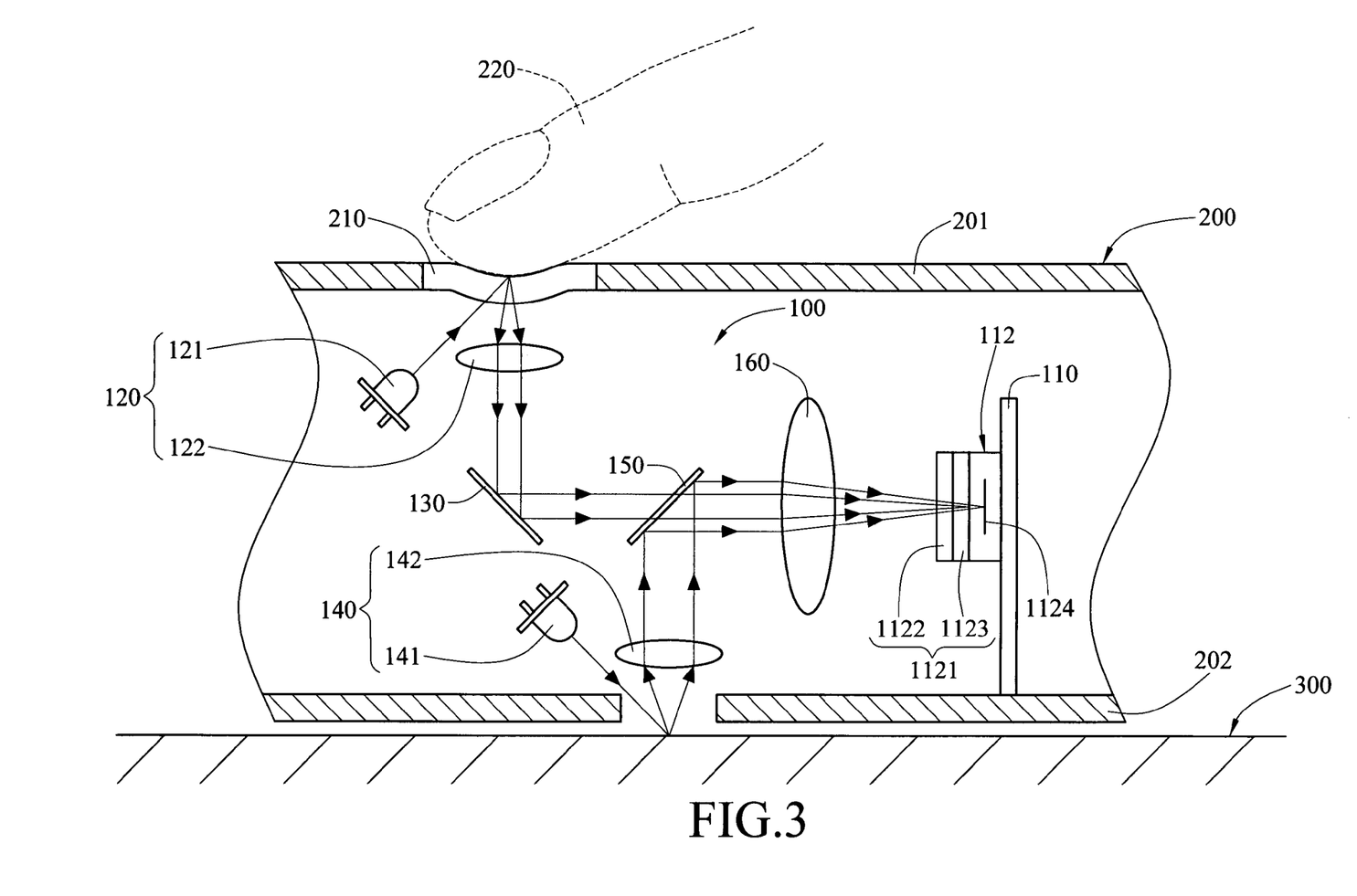
FIG. 3 is a schematic view of a third embodiment of the present invention.

FIG. 3 shows an optical trace detecting module 100 according to a third embodiment of the present invention. Referring FIG. 3, the optical trace detecting module 100 is disposed in a computer input device 200. A light-pervious plate 210 is provided on the upper surface 201 of the computer input device 200, and the light-pervious plate 210 is used for an object 220 (e.g., a finger of a user) to contact with and slide on the surface of it. A lower surface 202 of the computer input device 200 contacts with a plane 300 and may displace on the plane 300 relatively. The light-pervious plate 210 can be a transparent plate or lens made of transparent plastic, acryl, or glass that does not reduce the sensing efficiency of the optical trace detecting module 100. Furthermore, the light-pervious plate 210 has the function of light filtering to avoid the interference from the ambient lights. In addition, the light-pervious plate 210 may be, but not limited to, in the form of planar transparent plate, plano-concave lens, biconcave lens, plano-convex lens, or biconvex lens.

The optical trace detecting module 100 according to the third embodiment of the present invention includes a circuit board 110, a first projection set 120, a first optical path diverting element 130, a second projection set 140, a second optical path diverting element 150, and a third imaging lens 160. A bispectral optical sensor 112 is electrically disposed on the circuit board 110 to receive the images reflected from the object 220 and the plane 300. The first projection set 120 includes a first light source 121 and a first imaging lens 122. The first light source 121 and the first imaging lens 122 are disposed opposite to the light-pervious plate 210, and the first light source 121 may emit a first sensing beam having a first wavelength. The first optical path diverting element 130 is disposed between the first projection set 120 and the bispectral optical sensor 112. The second projection set 140 includes a second light source 141 and a second imaging lens 142. The second light source 141 and the second imaging lens 142 are disposed opposite to the plane 300, and the second light source 141 may emit a second sensing beam having a second wavelength identical to or different from the first wavelength. The second optical path diverting element 150 is disposed between the first optical path diverting element 130 and the bispectral optical sensor 112. The third imaging lens 160 is disposed between the second optical path diverting element 150 and the bispectral optical sensor 112. The first optical path diverting element 130 and the second optical path diverting element 150 disclosed according to the present invention are reflectors. However, different types of light directing methods may be employed by those skilled in the art, and not limited by the embodiments of the present invention.

As shown in FIG. 3, when the first light source 121 emits the first sensing beam toward the light-pervious plate 210, the object 220 reflects a first reflecting beam to the first imaging lens 122. The first reflecting beam is directed by the first optical path diverting element 130 to pass through the second optical path diverting element 150 and the third imaging lens 160 and is refracted to the bispectral optical sensor 112, such that the bispectral optical sensor 112 senses the displacement of the object 220 moving on the light-pervious plate 210, and generates a corresponding first control signal. When the second light source 141 emits the second sensing beam toward the plane 300, the plane 300 reflects a second reflecting beam to the second imaging lens 142. The second reflecting beam is directed by the second optical path diverting element 150 to pass through the third imaging lens 160 and is refracted to the bispectral optical sensor 112, such that the bispectral optical sensor 112 senses the second reflecting beam from the plane 300, and generates a corresponding second control signal.

The bispectral optical sensor 112 disclosed according to the third embodiment of the present invention further includes a filtering unit 1121 and a light signal receiving area 1124. The filtering unit 1121 further includes a first filter 1122 and a second filter 1123. The first filter 1122 is used for filtering out the first reflecting beam having the first wavelength, and the second filter 1123 is used for filtering out the second reflecting beam having the second wavelength. The light signal receiving area 1124 is disposed on one side of the filtering unit 1121 to receive the first reflecting beam and the second reflecting beam.

Figure 4:
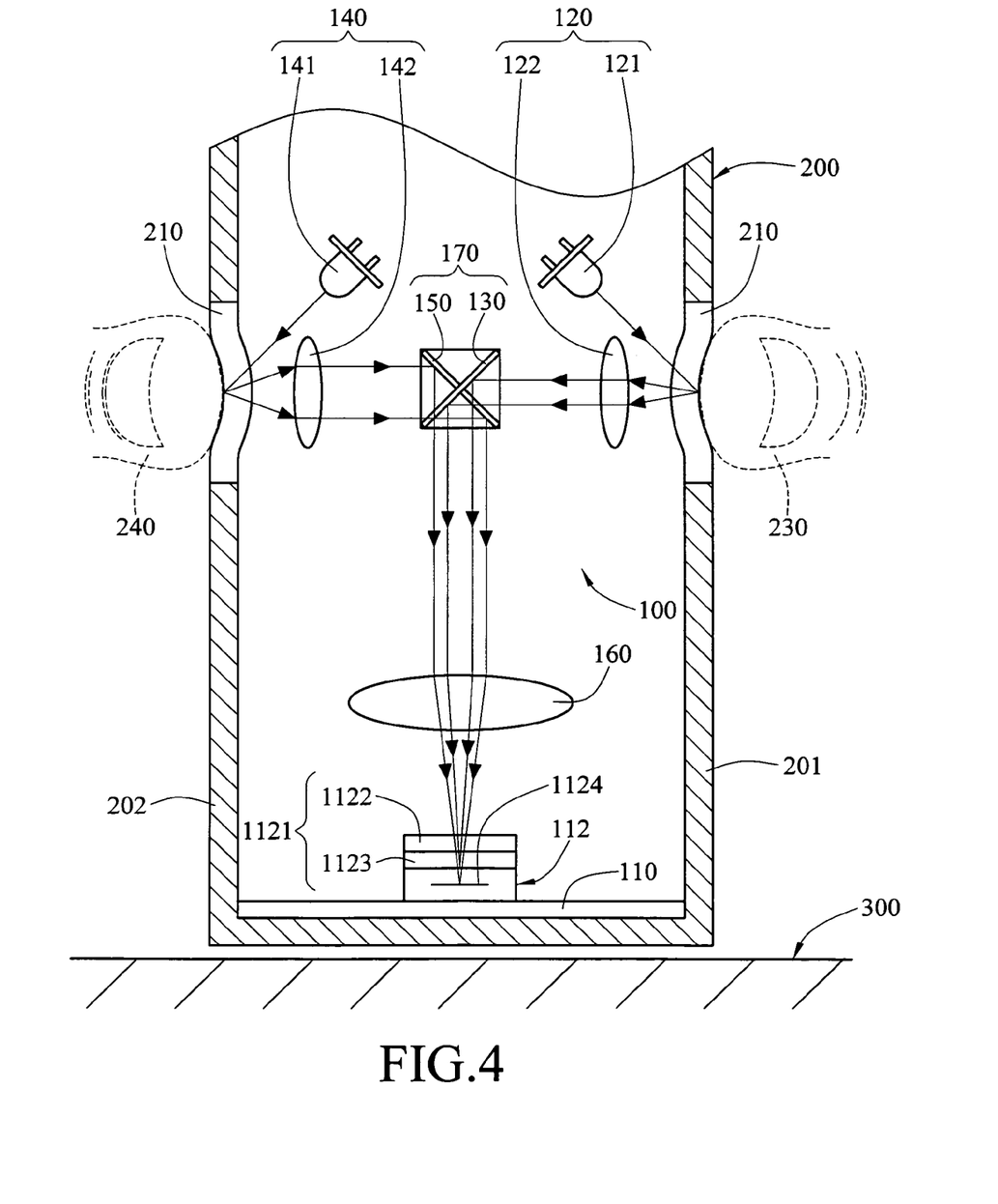
FIG. 4 is a schematic view of a fourth embodiment of the present invention.

FIG. 4 is a schematic view of a fourth embodiment according to the present invention. It should be noted that, the light-pervious plate 210 may also be disposed at the opening of the lower surface 202, such that the displacement of an object 230, 240 (e.g., a finger of a user) may be sensed simultaneously at both sides of the computer input device 200, and a corresponding control signal is generated. The light-pervious plate 210 can be a transparent plate or lens made of transparent plastic, acryl, or glass that does not reduce the sensing efficiency of the optical trace detecting module 100. Furthermore, the light-pervious plate 210 has the function of light filtering to avoid the interference from the ambient lights. In addition, the light-pervious plate 210 may be, but not limited to, in the form of planar transparent plate, plano-concave lens, biconcave lens, plano-convex lens, or biconvex lens.

The optical trace detecting module 100 according to the fourth embodiment of the present invention includes a circuit board 110, a first projection set 120, a first optical path diverting element 130, a second projection set 140, a second optical path diverting element 150, and a third imaging lens 160. A bispectral optical sensor 112 is electrically disposed on the circuit board 110. The first projection set 120 includes a first light source 121 and a first imaging lens 122. The first light source 121 and the first imaging lens 122 are disposed opposite to the light-pervious plate 210 on the upper surface 201, and the first light source 121 may emit a first sensing beam having a first wavelength. The first optical path diverting element 130 is disposed between the first projection set 120 and the bispectral optical sensor 112. The second projection set 140 includes a second light source 141 and a second imaging lens 142. The second light source 141 and the second imaging lens 142 are disposed opposite to the light-pervious plate 210 on the lower surface 202, and the second light source 141 may emit a second sensing beam having a second wavelength passing through the opening of the lower surface 202, in which the second wavelength is different from the first wavelength. The second optical path diverting element 150 is disposed between the first optical path diverting element 130 and the bispectral optical sensor 112. The third imaging lens 160 is disposed between the second optical path diverting element 150 and the bispectral optical sensor 112. The first optical path diverting element 130 and the second optical path diverting element 150 may together form a double sided reflecting prism (X prism) 170. With a surface coated with a film of the double sided reflecting prism 170, the first reflecting beam or the second reflecting beam can be transmitted or reflected.

As shown in FIG. 4, when the first light source 121 emits the first sensing beam toward the light-pervious plate 210 on the upper surface 201, the first object 230 moving on the light-pervious plate 210 reflects a first reflecting beam to the first imaging lens 122. The first reflecting beam is directed by the first optical path diverting element 130 to pass through the second optical path diverting element 150 and the third imaging lens 160 and is refracted to the bispectral optical sensor 112, such that the bispectral optical sensor 112 senses the displacement of the first object 230 moving on the light-pervious plate 210, and generates a corresponding first control signal. When the second light source 141 emits the second sensing beam toward the light-pervious plate 210 of the lower surface 202, the second object 240 reflects a second reflecting beam to the second imaging lens 142. The second reflecting beam is directed by the second optical path diverting element 150 to pass through the third imaging lens 160 and is refracted to the bispectral optical sensor 112, such that the bispectral optical sensor 112 senses the second reflecting beam from the second object 240, and generates a corresponding second control signal.

The bispectral optical sensor 112 disclosed according to the fourth embodiment of the present invention further includes a filtering unit 1121 and a light signal receiving area 1124. The filtering unit 1121 further includes a first filter 1122 and a second filter 1123. The first filter 1122 is used for filtering out the first reflecting beam having the first wavelength, and the second filter 1123 is used for filtering out the second reflecting beam having the second wavelength. The light signal receiving area 1124 is disposed on one side of the filtering unit 1121 to receive the first reflecting beam and the second reflecting beam.

It should be noted that, the light signal receiving area 1124 disclosed according to the present invention may be an image detection sensor, such as a CCD or a CMOS, which is used for detecting the variation of the image resulted from the finger's moving. The light signal receiving area 1124 may also be a radiation detection sensor used for detecting the variation of the physical properties of the light after being refracted, thereby obtaining a corresponding image data.

In the fourth embodiment of the present invention, the first reflecting beam and the second reflecting beam having different wavelengths are utilized to enable the bispectral optical sensor 112 to determine whether the light is reflected from the object 230 on the upper surface 201 or the object 240 on the lower surface 202, so as to accordingly retrieve and calculate the amount of displacement of the object 230 on the upper surface 201 or the object 240 on the lower surface 202.

The optical trace detecting module disclosed according to the present invention utilizes a modular design of a single optical sensor combined with different types of incorporated light paths. Therefore, the optical trace detecting module can use many different sampling times of signals, and can use sensing beams having different wavelengths, so as to obtain the function of signal retrieving and displacement calculating of more than two signals. The volume of the optical trace detecting module is significantly reduced and the process is simplified, so the objectives of thinning, lowering the manufacturing cost, and improving the assembly are achieved.

While the preferred embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

What is claimed is:

1. An optical trace detecting module, disposed in a computer input device, a light-pervious plate being disposed on an upper surface of the computer input device and used for an object to contact with and move on a surface thereof, a lower surface of the computer input device displacing on a plane relatively, the optical trace detecting module comprising:
    a circuit board, having an optical sensor electrically disposed thereon, for receiving an image reflected from the object and the plane;
    a first projection set, for emitting a first sensing beam to the object and making the object reflect a first reflecting beam;
    a first optical path diverting element, disposed between the first projection set and the optical sensor;
    a second projection set, for emitting a second sensing beam to the plane and making the plane reflect a second reflecting beam;
    a second optical path diverting element, disposed between the second projection set and the optical sensor; and
    a third imaging lens, disposed between the first optical path diverting element and the second optical path diverting element and the optical sensor;
    wherein the first reflecting beam is directed by the first optical path diverting element to pass through the third imaging lens and is refracted to the optical sensor, and the optical sensor senses the displacement of the object and generates a corresponding first control signal;
    wherein the second reflecting beam is directed by the second optical path diverting element to pass through the third imaging lens and is refracted to the optical sensor, and the optical sensor senses the plane and generates a corresponding second control signal.

2. The optical trace detecting module according to claim 1, wherein the first projection set includes a first light source and a first imaging lens, the first imaging lens is opposite to the light-pervious plate, the first light source emits the first sensing beam toward the object, and the object reflects the first reflecting beam to the first imaging lens.

3. The optical trace detecting module according to claim 1, wherein the second projection set includes a second light source and a second imaging lens, the second imaging lens is opposite to the plane, the second light source emits the second sensing beam toward the plane, and the plane reflects the second reflecting beam to the second imaging lens.

4. An optical trace detecting module, disposed in a computer input device, a light-pervious plate being disposed on an upper surface of the computer input device and used for an object to contact with and move on a surface thereof, a lower surface of the computer input device displacing on a plane relatively, the optical trace detecting module comprising:
    a circuit board, having a bispectral optical sensor electrically disposed thereon, for receiving an image reflected from the object and the plane;
    a first projection set, for emitting a first sensing beam to the object and making the object reflect a first reflecting beam having a first wavelength;
    a second projection set, for emitting a second sensing beam to the plane and making the plane reflect a second reflecting beam having a second wavelength;
    an optical path diverting element, disposed between the first projection set and the second projection set; and
    a third imaging lens, disposed between the optical path diverting element and the bispectral optical sensor;
    wherein the first reflecting beam is directed by the optical path diverting element to pass through the third imaging lens and is refracted to the bispectral optical sensor, and the bispectral optical sensor senses the displacement of the object and generates a corresponding first control signal;
    wherein the second reflecting beam is directed by the optical path diverting element to pass through the third imaging lens and is refracted to the bispectral optical sensor, and the bispectral optical sensor senses the plane and generates a corresponding second control signal.

5. The optical trace detecting module according to claim 4, wherein the first projection set includes a first light source and a first imaging lens, the first imaging lens is opposite to the light-pervious plate, the first light source emits the first sensing beam toward the object, and the object reflects the first reflecting beam to the first imaging lens.

6. The optical trace detecting module according to claim 4, wherein the second projection set includes a second light source and a second imaging lens, the second imaging lens is opposite to the plane, the second light source emits the second sensing beam toward the plane, and the plane reflects the second reflecting beam to the second imaging lens.

7. The optical trace detecting module according to claim 4, wherein the optical path diverting element is a double sided reflecting prism (X prism).

8. The optical trace detecting module according to claim 4, wherein the bispectral optical sensor further includes a filtering unit and a light signal receiving area, the filtering unit is used for filtering out the first reflecting beam having the first wavelength and the second reflecting beam having the second wavelength respectively, and the light signal receiving area is disposed on one side of the filtering unit to receive the first reflecting beam and the second reflecting beam.

9. The optical trace detecting module according to claim 8, wherein the filtering unit further includes a first filter and a second filter, the first filter is used for filtering out the first reflecting beam having the first wavelength, and the second filter is used for filtering out the second reflecting beam having the second wavelength.

10. An optical trace detecting module, disposed in a computer input device, comprising:
- a circuit board, having a bispectral optical sensor electrically disposed thereon;
- a first projection set, for emitting a first sensing beam to a first object and making the first object reflect a first reflecting beam having a first wavelength;
- a first optical path diverting element, disposed between the first projection set and the bispectral optical sensor;
- a second projection set, for emitting a second sensing beam to a second object and making the second object reflect a second reflecting beam having a second wavelength;
- a second optical path diverting element, disposed between the first optical path diverting element and the bispectral optical sensor; and
- a third imaging lens, disposed between the second optical path diverting element and the bispectral optical sensor;

wherein the first reflecting beam is directed by the first optical path diverting element to pass through the second optical path diverting element and the third imaging lens and is refracted to the bispectral optical sensor, and the bispectral optical sensor senses the displacement of the first object and generates a corresponding first control signal;

wherein the second reflecting beam is directed by the second optical path diverting element to pass through the third imaging lens and is refracted to the bispectral optical sensor, and the bispectral optical sensor senses the displacement of the second object and generates a corresponding second control signal.

11. The optical trace detecting module according to claim 10, wherein the first projection set includes a first light source and a first imaging lens, and the second projection set includes a second light source and a second imaging lens.

12. The optical trace detecting module according to claim 10, wherein the first optical path diverting element and the second optical path diverting element together form a double sided reflecting prism (X prism).

* * * * *